United States Patent
Pip et al.

(10) Patent No.: US 6,534,166 B1
(45) Date of Patent: *Mar. 18, 2003

(54) BIORIENTED POLYETHYLENE FILM WITH A HIGH WATER VAPOR TRANSMISSION RATE

(75) Inventors: Hans Joachim Pip, Arlon (BE); Rhonda Rogers Agent, Rochester, NY (US)

(73) Assignee: ExxonMobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/145,949

(22) Filed: Sep. 2, 1998

Related U.S. Application Data

(63) Continuation-in-part of application No. 09/079,807, filed on May 15, 1998, now abandoned.

(51) Int. Cl.[7] ............................ B32B 27/32; B32B 5/18
(52) U.S. Cl. ............................. 428/316.6; 428/317.9; 428/319.9; 428/516
(58) Field of Search ........................ 428/515, 516, 428/213, 910, 317.9, 319.7, 319.9, 315.5, 315.9, 220, 316.6, 318.4; 264/41, 290.2, 173.14, 172.19

(56) References Cited

U.S. PATENT DOCUMENTS

| 4,145,001 A | * | 3/1979 | Weyenberg ................... 239/56 |
| 5,885,721 A | * | 3/1979 | Su et al. ...................... 428/516 |
| 4,713,273 A | | 12/1987 | Freedman ..................... 428/40 |
| 4,176,954 A | | 1/1993 | Keller et al. ............. 428/317.9 |
| 6,106,956 A | * | 8/2000 | Heyn et al. ................. 428/516 |
| 6,228,505 B1 | * | 5/2001 | Agent et al. ................ 428/516 |

FOREIGN PATENT DOCUMENTS

WO    WO 98/14491     *    4/1998

OTHER PUBLICATIONS

"The Wiley Encyclopedia of Packaging Technology," pp 313–315 and 514–529 (1986). No month.

* cited by examiner

Primary Examiner—D. Lawrence Tarazano
(74) Attorney, Agent, or Firm—Keith A. Bell; Rick F. James

(57) ABSTRACT

Polyethylene films having desired water vapor transmission rates (WVTR) and methods of producing the same are provided. The methods include adherently superimposing at least one layer of a WVTR-controlling material to a base layer including a polyethylene and a cavitating agent, and subsequently biaxially orienting the composite polyethylene sheet to yield a film having the desired WVTR. The base layer has a porous microstructure and a WVTR substantially higher than the desired WVTR.

16 Claims, 2 Drawing Sheets

BIORIENTED POLYETHYLENE FILM WITH A HIGH WATER VAPOR TRANSMISSION RATE

This application is a continuation-in-part of Application Ser. No. 09/079,807, filed May 15, 1998 now abandoned.

BACKGROUND OF THE INVENTION

The present invention relates to polymer films and methods for preparing polymer films. Specifically, the present invention relates to bioriented polyethylene films having high water vapor transmission rates (WVTR) and methods of preparing the same.

Generally, in the preparation of a film from granular or pelleted polymer resin, the polymer is first extruded to provide a stream of polymer melt, and then the extruded polymer is subjected to the film-making process. Film-making typically involves a number of discrete procedural stages, including melt film formation, quenching, and windup. For a general description of these and other processes associated with film-making, see K R Osborn and W A Jenkins, *Plastic Films: Technology and Packaging Applications,* Technomic Publishing Co., Inc., Lancaster, Pa. (1992).

An optional part of the film-making process is a procedure known as "orientation." The "orientation" of a polymer is a reference to its molecular organization, i.e., the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process requires substantially different procedures. This is related to the different physical characteristics possessed by films made by the two conventional film-making processes: casting and blowing. Generally, blown films tend to have greater stiffness, toughness and barrier properties. By contrast, cast films usually have the advantages of greater film clarity and uniformity of thickness and flatness, generally permitting use of a wider range of polymers and producing a higher quality film.

Orientation is accomplished by heating a polymer to a temperature at or above its glass-transition temperature ($T_g$) but below its crystalline melting point ($T_m$), and then stretching the film quickly. On cooling, the molecular alignment imposed by the stretching competes favorably with crystallization and the drawn polymer molecules condense into a crystalline network with crystalline domains (crystallites) aligned in the direction of the drawing force. As a general rule, the degree of orientation is proportional to the amount of stretch, and inversely related to the temperature at which the stretching is performed. For example, if a base material is stretched to twice its original length (2:1) at a higher temperature, the orientation in the resulting film will tend to be less than that in another film stretched 2:1 but at a lower temperature. Moreover, higher orientation also generally correlates with a higher modulus, i.e., measurably higher stiffness and strength. Further, as a general rule, higher orientation correlates with lower WVTR values for films.

Previously, high WVTR values have been difficult to achieve with polyolefin films. Typically, film production methods aim to lower WVTR values for polyolefin films. As such, polyolefin films inherently have low WVTR values compared to traditional wrapping materials such as cellulose films or paper.

Accordingly, it is one of the purposes of this invention, among others, to produce bioriented polyethylene films having high WVTR values, by providing an economical and relatively uncomplicated method of making polyethylene films that imparts superior characteristics to the films, without requirement for chemical additives such as cross-linking agents, and without requirement for supplemental processing steps such as irradiation of the film.

SUMMARY OF THE INVENTION

It has now been discovered that these and other purposes can be achieved by the present invention, which provides for bioriented polyethylene films having high WVTR values and methods of producing the same.

Various structured polyethylene films having high WVTR can be produced by the methods of the present invention. One embodiment of the present invention provides for a film having a base layer and at least one layer of a WVTR controlling material whereby the polyethylene film has a desired WVTR and the base layer has a porous microstructure and WVTR substantially higher than the desired WVTR for the polyethylene film. The base layer includes polyethylene and a cavitating agent, and preferably, the polyethylene is a medium density polyethylene (MDPE) or a high density polyethylene (HDPE). The base layer also has a first side and a second side. Further, the base layer preferably has a thickness of from about 0.5 mil to about 2.0 mil (1 mil=0.001 inch=100 gauge). It should be noted that any thickness value provided herein does not account for additional thickness resulting from cavitation.

The WVTR-controlling layer of the polyethylene film is coextensive with one of the sides of the base layer and includes a WVTR-controlling material, either a MDPE or a HDPE, which should not have a density greater than that of the polyethylene in the base layer. Further, it is preferable that the WVTR-controlling layer have a thickness of from about 0.03 mil (3 gauge) to about 0.15 mil (15 gauge).

A preferred embodiment of the present invention provides for a film having the desired WVTR and having a tie layer interposed between a base layer and a WVTR-controlling layer wherein the tie layer is coextensive with each of the base layer and the WVTR-controlling layer. The base layer, which includes polyethylene and a cavitating agent, has a first side and a second side. Further, the base layer has a porous microstructure and a WVTR substantially higher than the desired WVTR for the polyethylene film. Preferably, the WVTR-controlling layer includes a WVTR-controlling material of either MDPE or HDPE. Alternatively, the WVTR-controlling material can be either an ethylene-propylene copolymer or an ethylene-propylene-butylene terpolymer wherein the tie layer would be either a MDPE or a blend of HDPE and low density polyethylene (LDPE).

Another preferred embodiment of the present invention provides for a film having the desired WVTR wherein the film has first and second layers of a WVTR-controlling material coextensive with the first and second sides of the base layer. The base layer, which includes polyethylene and a cavitating agent, has a porous microstructure and a WVTR substantially higher than the desired WVTR for the polyethylene film. The first and second WVTR-controlling layers should each include a WVTR-controlling material of preferably either a MDPE or a HDPE.

Another preferred embodiment of the present invention provides for a film wherein a first tie layer is interposed between a base layer and a first WVTR-controlling layer and a second tie layer is interposed between the base layer and a second WVTR-controlling layer. The first tie layer is coextensive with each of the base layer and first WVTR-controlling layer and the second tie layer is coextensive with each of the base layer and the second WVTR-controlling layer.

It should be noted that polyethylene films according to the present invention are not limited to the foregoing structures and can include several layers as a plurality of WVTR-controlling layers or tie layers can be provided to obtain a film having the desired WVTR.

The methods of the present invention provide for adherently superimposing at least one layer of a WVTR-controlling material coextensively to a first side of a base layer having first and second sides and then biaxially orienting the composite polyethylene sheet to obtain a film having a desired WVTR. The base layer of the composite polyethylene sheet includes polyethylene and a cavitating agent. The composite polyethylene sheet is biaxially oriented whereby there is provided a bioriented polyethylene film having the desired WVTR and whereby the base layer has a porous microstructure and a WVTR substantially higher than the desired WVTR.

Preferably, the polyethylene of the base layer is a MDPE or a HDPE. Further, it is preferable that the amount of polyethylene provided in the base layer prior to producing a film be an amount sufficient to yield a base layer in the film having a thickness of from about 0.5 mil to about 2.0 mil. It should be noted that any thickness value provided herein does not account for additional thickness resulting from cavitation.

In addition, it is preferable that the WVTR-controlling material is a MDPE or a HDPE, however, the WVTR-controlling material should not have a density greater than that of the polyethylene in the base layer. Further, it is preferable that the WVTR-controlling material is provided in an amount sufficient to yield a WVTR-controlling layer in the film having a thickness of from about 0.03 mil to about 0.15 mil.

A preferred method of the present invention provides for producing a film having a three layer structure. In particular, a first layer of a WVTR-controlling material is adherently superimposed to a first side of a base layer and a second layer of a WVTR-controlling material is adherently superimposed to the second side of the base layer. The composite polyethylene sheet is then biaxially oriented.

Another preferred method of the present invention provides for producing a film having a five layer structure. In particular, a base layer having first and second sides is provided and is interposed between two tie layers wherein the first tie layer is interposed between the first side of the base layer and a first WVTR-controlling layer, and wherein the second tie layer is interposed between the second side of the base layer and a second WVTR-controlling layer. The tie layers are each adherently superimposed to the base layer and are each coextensive with the base layer. The WVTR-controlling layers are each adherently superimposed to the tie layers and are each coextensive with their adjacent tie layer. The composite polyethylene sheet is then biaxially oriented. The tie layers of this structure include MDPE or HDPE and can also include a cavitating agent to regulate the WVTR.

Another method of the present invention provides for producing a film by adherently superimposing at least one tie layer to a base layer wherein the tie layer is coextensive with the base layer, and further, adherently superimposing a WVTR-controlling layer to the tie layer wherein the WVTR-controlling layer is coextensive with the tie layer. The WVTR-controlling layer comprises a WVTR-controlling material of preferably HDPE or MDPE. The tie layer includes MDPE or HDPE and can also include a cavitating agent to regulate the WVTR. However, an alternative method includes provision for a WVTR-controlling layer including a WVTR-controlling material of either an ethylene-propylene copolymer or an ethylene-propylene-butylene terpolymer wherein the tie layer includes either a MDPE or a blend of HDPE and LDPE.

The present invention provides methods of producing polyethylene films having high WVTR values, opacity, high stiffness and resistance to humidity. The films also have excellent deadfold characteristics which make them well suited for packaging of foods in bag-in-box operations conducted on vertical, form, fill and seal (VFFS) machinery. These properties make these films an excellent alternative to paper or cellophane in applications where high WVTR and insensitivity of film to moisture are required.

These and other advantages of the present invention will be appreciated from the detailed description and examples which are set forth herein. The detailed description and examples enhance the understanding of the invention, but are not intended to limit the scope of the invention.

BRIEF DESCRIPTION OF THE DRAWINGS

Preferred embodiments of the invention have been chosen for purposes of illustration and description, but are not intended in any way to restrict the scope of the invention. The preferred embodiments of certain aspects of the invention are shown in the accompanying drawings, wherein.

DETAILED DESCRIPTION OF THE PREFERRED EMBODIMENTS

Figure 1:
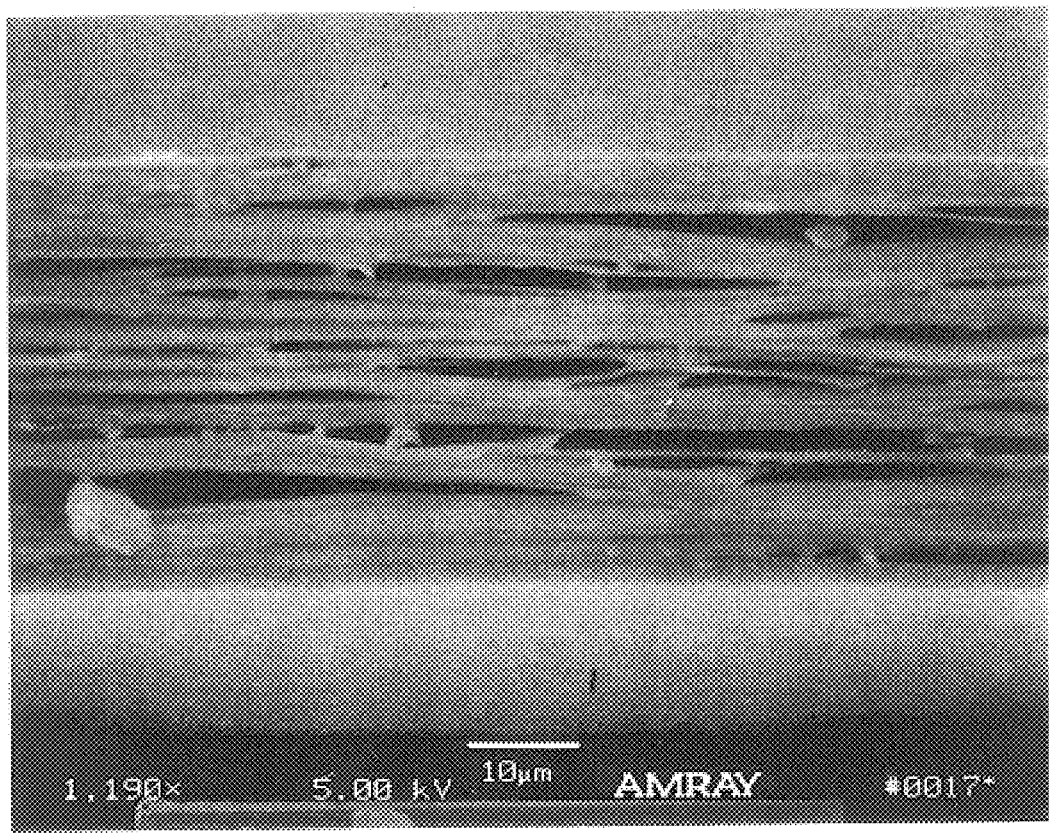
FIG. 1 is a scanning electron micrograph showing a cross-sectional view of a conventional cavitated bioriented polypropylene film.

The present invention provides for bioriented polyethylene films having high WVTR and methods for producing the same. To practice the methods of the present invention, a polyethylene sheet is provided wherein at least one layer of a WVTR-controlling material is adherently superimposed to a core or base layer. The polyethylene sheet is then biaxially oriented resulting in a film having a desired WVTR. The resulting film has a base layer having a porous microstructure and a substantially higher WVTR than the desired WVTR for the film.

The base layer includes a polyethylene and a cavitating agent. Preferably, the polyethylene is a HDPE or a MDPE. The amount of polyethylene provided in the base layer prior to producing a film should be an amount sufficient to yield a base layer in the film having a thickness of from about 0.5 mil to about 2.0 mil, preferably about 0.85 mil to about 1.10 mil. It should be noted that any thickness value provided herein does not account for additional thickness resulting from cavitation.

As the term HDPE is used herein, it is defined to mean an ethylene-containing polymer having a density of 0.940 or higher. (Density (d) is expressed as $g/cm^3$.) One particularly suitable HDPE for use with the methods of the present invention is the resin sold as M6211 by Equistar. Another particularly suitable HDPE is the resin sold as HD 7845 by Exxon. Other suitable HDPE resins include, for example, BDM 94-25 available from Fina Oil and Chemical Co., Dallas, Tex., and Sclair 19C and 19F available from Nova Corporation, Sarnia, Ontario, Canada.

The term "medium density polyethylene" (MDPE) as used herein is defined to mean an ethylene-containing polymer having a density of from about 0.926 to about 0.940. MDPE is readily available, e.g., Dowlex™ 2027A from The Dow Chemical Company, and Nova 74B and Nova 14G from Nova Corporation, Sarnia, Ontario, Canada.

As mentioned above, a cavitating agent is provided in the base layer. Such agents are typically added to the core or base layer prior to extrusion and are capable of generating voids (cavities) in the structure of the film during the film-making process. It is believed that small inhomogeneities introduced into the core layer by the cavitating agent result in points of weakness in the polyethylene sheet. The biaxial orienting step then induces tears in the core layer, causing cavitation in the processed film. The tears in the core layer vary in size and are formed not only horizontally, i.e., within or parallel to the plane of the film, but also in the vertical dimension or perpendicular to the plane of the film.

Any suitable cavitating agent can be used. One especially preferred cavitant which can be used to practice the methods of the present invention is calcium carbonate ($CaCO_3$). Other cavitating agents can also be used. Organic cavitating agents are also known, but are generally less preferred due to their limited operating temperature range. However, such organic cavitants can be useful if they are extremely finely divided and are either resistant to melting at operating temperatures or produce a suitable inhomogeneity in the polyethylene sheet. Cavitating agents can be included using methods known in the art, such as that described in PCT publication WO 9414606 A1 incorporated herein by reference. Accordingly, in the methods of the invention in which a cavitating agent is employed, $CaCO_3$, polyacrylate particulates, polystyrene or other cavitants can be included in the base layer.

The percentage of cavitating agent included in the base layer depends upon the desired WVTR. In particular, if a higher WVTR is desired, then more cavitating agent should be included in the base layer. Generally, the base layer can include from about 1 wt. % to about 30 wt. % of a cavitating agent. It is preferable, though, that the base layer include from about 3 wt. % to about 10 wt. % of a cavitating agent.

The WVTR-controlling layer includes a WVTR-controlling material. Any material that limits the WVTR in the resulting film can be used. Given the typically small dimensions of the WVTR-controlling layer, the WVTR-controlling material preferably should have a normalized WVTR (WVTR of 1 mil thick of film) lower than the normalized WVTR of the film, and substantially lower than the normalized WVTR of the cavitated polyethylene base layer. Preferred WVTR-controlling materials include MDPE or HDPE. The WVTR-controlling material can have a density as great as that of the polyethylene in the base layer, but it should not have a density greater than that of the polyethylene in the base layer. The amount of WVTR-controlling material included in the WVTR-controlling layer prior to adherently superimposing the WVTR-controlling layer to the base layer should be an amount sufficient to yield a WVTR-controlling layer in the film having a thickness of from about 0.01 mil to about 0.25 mil, preferably from about 0.03 mil to about 0.15 mil.

A film is produced by the methods of the present invention using conventional casting apparatus. For example, cast extrusion is generally accomplished using a standard multi-roll stack system or a cast roll with an air cap (high velocity air applied to the outside of the sheet). Other casting apparatus is also useful, such as a cast roll and water bath system.

A polyethylene film prepared according to the present invention is biaxially oriented. Biaxial orientation is employed to evenly distribute the strength qualities of a film in the longitudinal or "machine direction" (MD) of the film and in the lateral or "transverse direction" (TD) of the film. Biaxial oriented films tend to be stiffer and stronger, and also exhibit much better resistance to flexing and folding forces, leading to greater utility in packaging applications.

Biaxial orientation can be conducted simultaneously in both directions, however, most biaxial orientation processes use apparatus which stretches the film sequentially, first in one direction and then in the other. A typical apparatus will stretch a film in the MD first and then in the TD. The degree to which a film can be stretched is dependent upon factors including, for example, the polymer from which a film is made. For further discussion concerning high biorientation of polyethylene films, see U.S. Pat. No. 5,885,721, which is incorporated herein by reference.

A film according to the present invention is made from polyethylene and can be stretched to a relatively high degree. In particular, a film can be stretched in the MD to a degree of from about 5:1 to about 8:1 and in the TD to a degree of from about 6:1 to 15:1. Nevertheless, as a general rule with a film of this invention, the higher the degree of stretch in both the MD and the TD, the higher the WVTR in the resulting film. The temperature at which a film is biaxially oriented ("stretch temperature") can also influence the WVTR in the resulting film. As shown below in EXAMPLE 3, the WVTR of a resulting film can be increased by biaxially orienting a film at a lower stretch temperature.

Several embodiments of polyethylene films can be produced by the methods of the present invention. One exemplary embodiment of a film, which can be produced by the methods provided herein, has a base layer including HDPE and $CaCO_3$. The base layer is interposed between two WVTR-controlling layers, each of which includes MDPE. Sufficient amounts of HDPE, $CaCO_3$ and WVTR-controlling material are provided prior to film production to yield a base layer of the film having a thickness from about 0.85 mil to about 1.10 mil and WVTR-controlling layers each having a thickness from about 0.03 mil to about 0.15 mil.

Another exemplary embodiment provides for a film having a base layer including MDPE and $CaCO_3$. The base layer is interposed between two WVTR-controlling layers and is coextensive with each of the WVTR-controlling layers. Further, a sufficient amount of MDPE and $CaCO_3$ is provided prior to film production to yield a base layer of the film having a thickness from about 0.85 mil to about 1.10 mil and a sufficient amount of WVTR-controlling material should also be provided to yield WVTR-controlling layers each having a thickness from about 0.03 mil to about 0.15 mil. In addition, the WVTR-controlling layers can be of the same or different materials as desired. This film is preferable in some applications since it is less stiff and it creases less than films having a base layer including HDPE. In addition, this film has unidirectional tear properties in the machine direction.

Another exemplary embodiment provides for at least one tie layer interposed between a base layer and a WVTR-controlling layer wherein the tie layer is coextensive with each of the base layer and the WVTR-controlling layer. Additional tie layers can be provided to this structure to obtain a film having the desired WVTR. The tie layer of this embodiment includes MDPE or HDPE and the base layer includes HDPE and $CaCO_3$. Additionally, the tie layer can include pigment to provide color to the film and varying amounts of a cavitating agent to regulate the WVTR of the film.

Another exemplary embodiment is a five layer structure having a base layer, with first and second sides, interposed between two tie layers wherein one tie layer is interposed between the first side of the base layer and a first WVTR-controlling layer and the other tie layer is interposed between the second side of the base layer and a second WVTR-controlling layer. The tie layers of this structure are coextensive with the base layer and each of the WVTR-controlling layers is coextensive with its adjacent tie layer.

The base layer of this five layer structure includes HDPE and $CaCO_3$ and the tie layers include MDPE or HDPE. Process conditions, though, can warrant using a tie layer including HDPE and $CaCO_3$ if further cavitation is desired. In addition, the two tie layers can be of the same or different materials as desired. The WVTR-controlling layers of this structure include MDPE as the WVTR-controlling material. The result of biaxially orienting a sheet having this five layer structure is a rigid and opaque film having a gloss of about 25% and paperlike characteristics.

Another exemplary embodiment also has a five layer structure having a base layer interposed between two tie layers wherein one tie layer is interposed between the first side of the base layer and a first WVTR-controlling layer and the other tie layer is interposed between the second side of the base layer and a second WVTR-controlling layer. The base layer of this layer structure includes HDPE and $CaCO_3$. The tie layers of this structure include either a MDPE or a blend of HDPE and LDPE to assure good skin adhesion and can be of the same or different materials as desired. The WVTR-controlling material of the first and second WVTR-controlling layers of this structure includes an ethylene-propylene copolymer or an ethylene-propylene-butylene terpolymer. Further, the WVTR-controlling layers can be of the same or different materials as desired.

The result of biaxially orienting a sheet having this five layer structure where the WVTR-controlling material is an ethylene-propylene copolymer or an ethylene-propylene-butylene terpolymer, is a film having a high gloss typically greater than 50% (ASTM D 2457). In addition, the resulting five layer film is paperlike, opaque and rigid.

While these and other embodiments can be produced according to the methods of the present invention, it should be noted that several other film structures having multiple layers with varying compositions and thicknesses can be produced having a desired WVTR in accordance with the present invention.

The films of the present invention can be surface treated with conventional methods to improve wettability of the film and ink receptivity. Films can further be coated by known methods to modify barrier characteristics, provide heat seal properties and modify surface characteristics. The films can be modified by metallization to obtain a metal-like appearance and altered barrier characteristics.

The films of the present invention are useful in numerous applications including food packaging and in particular, in food packaging where high WVTR is desirable such as the packaging of cheese products. Additionally, these films are advantageous for use in cigarette pack inner liners, as overwrap for butter, chocolate, candy, etc., and as twistwrap.

The following examples are provided to assist in further understanding the invention. The particular materials and conditions employed are intended to be further illustrative of the invention and are not limiting upon the reasonable scope thereof A series of experiments were performed to illustrate features and advantages of the present invention. Several of the manufacturing conditions were common to each case. For example, a polyethylene sheet was cast at a temperature between 160–180° F. depending upon the thickness of the sheet, i.e., the caster temperature was higher for thicker sheets. In addition, orientation was performed using conventional orienting equipment in each case. Further, each film was stretched in the machine direction at a temperature of about 245–250° F. and in the transverse direction at about 262° F.

EXAMPLE 1

Figure 2:
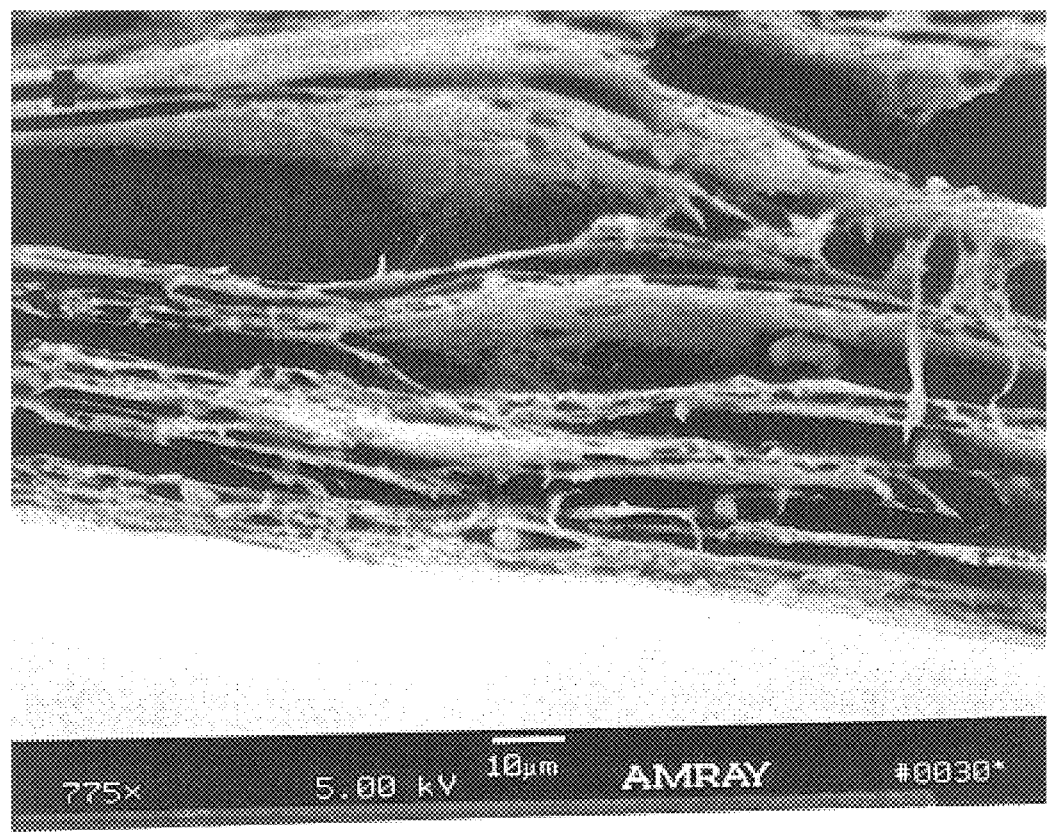
FIG. 2 is a scanning electron micrograph showing a cross-sectional view of a film prepared according to the present invention.

Referring now to FIGS. 1 and 2, cavitation of a film according to the present invention results in a surprising increase in the WVTR of the film. FIG. 1 is a scanning electron micrograph showing a cross-section through a conventional cavitated bioriented polypropylene (OPP) film. The core layer of the film contains 5% $CaCO_3$ as a cavitating agent. It is apparent that the cavitation introduced into this OPP film is exclusively within the plane defined by the film. Virtually no opening of the film in the dimension normal to the film plane (vertical) is evident. The physical structure of the cavitation in polypropylene is reflected in the minimal effect on the WVTR of the film. Typically, cavitation in OPP films increases WVTR by no more than about 10%.

By contrast, FIG. 2 is a scanning electron micrograph of a cross-section of a film prepared according to a method of the present invention. This film has a core layer of HDPE containing about 5% $CaCO_3$ as a cavitant. It is clear from FIG. 2 that the cavitation introduced into the core layer includes not only the opening up in the film plane that is consistent with the cavitation observed in polypropylene, but also contains a significant and surprising degree of opening in the vertical dimension. This unexpected vertical opening in the film structure is observed to correlate with extraordinary increases in the WVTR of the core layer. It has been found that this feature of the films of the present invention permits selection of a wide range of WVTR values for the film by the process of providing one or more WVTR-controlling layers to limit net WVTR for the resulting film.

EXAMPLE 2

TABLE 1 shows a film structure produced by a method of the present invention. The film has an unexpectedly high WVTR of greater than 3.0 g/100 $inch^2$·day.

TABLE 1

| Layers(from top to bottom) | Composition of Layer | Layer Thickness(mil) |
|---|---|---|
| Outer | MDPE | 0.03 |
| Tie | MDPE | 0.10 |
| Core | HDPE + $CaCO_3$ | 0.89 |
| Tie | HDPE + $CaCO_3$ | 0.10 |
| Outer | MDPE | 0.03 |

It should be noted that the top side of this film structure is the caster side and the bottom side of the film structure is the airknife side. Also, the thickness of each layer does not account for any additional thickness resulting from cavitation.

The percentage of cavitant in the core layer and the tie layer on the airknife side of the film is about 5 to 10% by weight of the layer. To increase the WVTR, more cavitant can be added to either or both layers containing cavitant. Additionally, cavitant can be added to the tie layer on the caster side of the film to increase the WVTR. This particular example includes MDPE in the tie layer on the caster side to reduce the WVTR.

The WVTR of a film can be increased or decreased by varying the physical conditions with respect to the film-making process. For example, reducing the thickness of non-cavitated layers increases the WVTR. Likewise, reducing the resin density of non-cavitated layers increases the WVTR of a film. The WVTR can also be increased by using lower stretch temperatures as shown in EXAMPLE 3 below or by using higher stretch ratios in the machine or transverse directions.

With respect to the resulting film of this example, the WVTR is much higher than anticipated. Other physical attributes of the film include a gloss of 25% (ASTM D 2457) and a light transmission ratio of 20% (ASTM 1003). The film thickness is 2.00 mil and the yield is about 25,000 $inch^2$/lb.

EXAMPLE 3

The film structures described in TABLE II show that WVTR increases when stretching is performed at lower temperatures and when structures are more cavitated.

of Samples 1 and 3. Clearly, increasing the cavitation of a film results in higher WVTR values.

Sample 6 shows a film structure wherein an ethylene-propylene copolymer is substituted for MDPE in the WVTR-controlling layers. This film has a higher WVTR in comparison to Samples 1 and 3 and it also has a high gloss of 61%.

EXAMPLE 4

TABLE III shows three layer film structures resulting from process conditions different than those used in obtaining the results of TABLE II. In particular, the results of TABLE III show that WVTR increases as cavitation increases regardless of what cavitant is used.

TABLE III

| Sample | Layer 1 | Layer 2 | Layer 3 | WVTR |
|---|---|---|---|---|
| 7 | 0.17 MDPE | 0.81 HDPE (M6211 Resin) | 0.17 MDPE | 0.2 |
| 8 | 0.17 MDPE | 0.81 HDPE + 7% $CaCO_3$ | 0.17 MDPE | 4.0 |
| 9 | 0.17 MDPE | 0.81 HDPE + 7% $CaCO_3$ | 0.17 MDPE | 7.2 |
| 10 | 0.17 MDPE | 0.81 HDPE + 7% Epostar MA1002 | 0.17 MDPE | 5.2 |

The thickness of the HDPE and MDPE layers is expressed above in mils and does not take into account additional

TABLE II

| Sample | Layer 1 | Layer 2 | Layer 3 | Layer 4 | Layer 5 | WVTR |
|---|---|---|---|---|---|---|
| 1 | 0.03 MDPE | 0.10 HDPE | 0.89 HDPE + 7% $CaCO_3$ | 0.10 HDPE | 0.03 MDPE | 1.00 |
| 2 | 0.03 MDPE | 0.10 HDPE | 0.89 HDPE + 7% $CaCO_3$ | 0.10 HDPE | 0.03 MDPE | 2.05 |
| 3 | 0.03 MDPE | 0.10 HDPE | 0.89 HDPE + 7% $CaCO_3$ | 0.10 HDPE | 0.03 MDPE | 0.88 |
| 4 | 0.03 MDPE | 0.10 MDPE | 0.89 HDPE + 7% $CaCO_3$ | 0.10 HDPE + 7% $CaCO_3$ | 0.03 MDPE | 2.93 |
| 5 | 0.03 MDPE | 0.10 HDPE + 7% $CaCO_3$ | 0.89 HDPE + 7% $CaCO_3$ | 0.10 HDPE + 7%$CaCO_3$ | 0.03 MDPE | 14.1 |
| 6 | 0.03 EP Copolymer | 0.10 MDPE | 0.89 HDPE + 7% $CaCO_3$ | 0.10 MDPE | 0.03 EP Copolymer | 2.67–4.12 |

The thickness of the HDPE and MDPE layers is expressed above in mils and does not take into account additional thickness resulting from cavitation. In addition, the WVTR is expressed above in g/100 $inch^2$·day.

Samples 1 and 3 were produced under similar conditions to establish a constant WVTR for comparison with WVTR values resulting from different physical conditions. Sample 2 was produced at a stretch temperature about 3° F. lower than that of Sample 1. Comparing the WVTR, of Samples 1 and 3 with that of Sample 2, it is readily apparent that a lower stretch temperature caused an increase in the WVTR of Sample 2.

Sample 4 was produced at conditions similar to Samples 1 and 3 except that layer 4 of Sample 4 was cavitated. The resulting increase in WVTR in Sample 4 compared to those of Samples 1 and 3 indicates that WVTR increases as a film is more cavitated.

The result in Sample 5 further supports the assertion drawn from the comparison of Sample 4 to Samples 1 and 3. In particular, tie layers 2 and 4 of Sample 5 were cavitated and the resulting WVTR was much higher than the WVTR thickness resulting from cavitation. In addition, the WVTR is expressed above in g/100 $inch^2$·day.

Sample 7 can be compared to Samples 8–10 to prove that cavitation increases WVTR of a film. In particular, Sample 7 which is not cavitated had a resulting WVTR of 0.2 g/100 $inch^2$·day whereas Samples 8–10 which each had a cavitated core layer had resulting WVTRs of 4.0 g/100 $inch^2$·day, 7.2 g/100 $inch^2$·day and 5.2 g/100 $inch^2$·day, respectively.

Sample 10 is comparable to Samples 8 and 9 to illustrate that cavitating agents other than calcium carbonate ($CaCO_3$) can be used to obtain similar results. In particular, Epostar MA 1002 was used as the cavitating agent in Sample 10. The resulting WVTR of 5.2 g/100 $inch^2$·day in Sample 10 supports the notion that cavitating agents other than calcium carbonate ($CaCO_3$) can be used with the polyethylene films of the present invention.

Thus, while there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

What is claimed is:

1. A two-layer polyethylene film comprising:
   (a) a base layer comprising polyethylene and a cavitating agent; and
   (b) a second layer of a water vapor transmission rate (WVTR)-controlling material comprising high density polyethylene (HDPE) or medium density polyethylene (MDPE);
   wherein the polyethylene film has a WVTR, and wherein the base layer has a porous microstructure and a WVTR higher than the WVTR of the polyethylene film.

2. The two-layer polyethylene film according to claim 1, wherein the density of the polyethylene in the second layer is less then the density of the polyethylene in the base layer.

3. A polyethylene film comprising:
   (a) a base layer comprising polyethylene and a cavitating agent; and
   (b) a pair of layers of a water vapor transmission rate (WVTR)-controlling material comprising high density polyethylene (HDPE) or medium density polyethylene (MDPE), wherein at least one layer of said pair comprises a cavitating agent;
   wherein the base layer is disposed between and adjacent to the pair of layers, wherein the polyethylene film has a WVTR, and wherein the base layer has a porous microstructure and a WVTR higher than the WVTR of the polyethylene film.

4. The polyethylene film according to claim 3, wherein the density of the polyethylene in the pair of layers is less then the density of the polyethylene in the base layer.

5. The polyethylene film according to claim 3, wherein the cavitating agent is calcium carbonate ($CaCO_3$) or a polystyrene.

6. A polyethylene film comprising:
   (a) a base layer comprising polyethylene and a cavitating agent;
   (b) a pair of tie layers comprising high density polyethylene (HDPE) or medium density polyethylene (MDPE), wherein the base layer is disposed between and adjacent to the pair of tie layers; and
   (c) a pair of outer layers of a water vapor transmission rate (WVTR)-controlling material comprising MDPE;
   wherein the polyethylene film has a WVTR, and wherein the base layer has a porous microstructure and a WVTR higher than the WVTR of the polyethylene film.

7. The polyethylene film according to claim 6, wherein the density of the polyethylene in the ter layers is less then the density of the polyethylene in the base layer.

8. The polyethylene film according to claim 6, wherein the cavitating agent is calcium carbonate ($CaCO_3$) or a polystyrene.

9. A polyethylene film comprising:
   (a) a base layer comprising high density polyethylene (HDPE) and a cavitating agent;
   (b) a pair of tie layers comprising HDPE and a cavitating agent, wherein the base layer is disposed between and adjacent to the pair of tie layers; and
   (c) a pair of outer layers of a water vapor transmission rate (WVTR)-controlling material comprising polypropylene;
   wherein the polyethylene film has a WVTR, and wherein the base layer has a porous microstructure and a WVTR higher than the WVTR of the polyethylene film.

10. The polyethylene film according to claim 9, wherein the outer layers comprise a propylene copolymer or terpolymer comprising about 80% propylene and at least one other alpha olefin.

11. The polyethylene film according to claim 9, wherein the outer layers comprise a copolymer of propylene-ethylene or a terpolymer of propylene-ethylene-butylene.

12. The polyethylene film according to claim 9, wherein the cavitating agent is calcium carbonate ($CaCO_3$) or a polystyrene.

13. A polyethylene film comprising:
    (a) a base layer comprising medium density polyethylene (MDPE) and a cavitating agent;
    (b) a pair of tie layers comprising MDPE, wherein the base layer is disposed between and adjacent to the pair of tie layers; and
    (c) a pair of outer layers of a water vapor transmission rate (WVTR)-controlling material comprising polypropylene;
    wherein the polyethylene film has a WVTR, and wherein the base layer has a porous microstructure and a WVTR higher than the WVTR of the polyethylene film.

14. The polyethylene film according to claim 13, wherein the outer layers comprise a propylene copolymer or terpolymer comprising about 80% propylene and at least one other alpha olefin.

15. The polyethylene film according to claim 13, wherein the outer layers comprise a copolymer of propylene-ethylene or a terpolymer of propylene-ethylene-butylene.

16. The polyethylene film according to claim 15, wherein the cavitating agent is calcium carbonate ($CaCO_3$) or a polystyrene.

* * * * *